(12) United States Patent
Ballintine et al.

(10) Patent No.: US 8,713,517 B2
(45) Date of Patent: Apr. 29, 2014

(54) DATA ARCHITECTURE AND USER INTERFACE FOR PLASMA PROCESSING RELATED SOFTWARE APPLICATIONS

(75) Inventors: Paul Ballintine, Pleasanton, CA (US); Jaime Sarmiento, Tracy, CA (US); Duane Smith, Pleasanton, CA (US); Chad R. Weetman, Pleasanton, CA (US)

(73) Assignee: Lam Research Corporation, Fremont, CA (US)

( * ) Notice: Subject to any disclaimer, the term of this patent is extended or adjusted under 35 U.S.C. 154(b) by 290 days.

(21) Appl. No.: 13/188,390

(22) Filed: Jul. 21, 2011

(65) Prior Publication Data

US 2013/0024012 A1    Jan. 24, 2013

(51) Int. Cl.
*G06F 9/45* (2006.01)
(52) U.S. Cl.
USPC ......................................................... 717/106
(58) Field of Classification Search
USPC ......................................................... 717/106
See application file for complete search history.

(56) References Cited

U.S. PATENT DOCUMENTS 6,636,242 B2 * 10/2003 Bowman-Amuah .......... 715/764
2011/0023013 A1 * 1/2011 Shenfield et al. ............. 717/107

* cited by examiner

*Primary Examiner* — John Chavis
(74) *Attorney, Agent, or Firm* — Beyer Law Group LLP

(57) ABSTRACT

An architecture for creating a plasma-processing-related application is provided. The architecture includes a foundation layer having a plurality of framework components, wherein the framework components including at least one of security component, data management component and user interface (UI) component. The architecture also includes an analysis view layer having a set of views, wherein the set of views are generated utilizing components from the foundation layer. The architecture further includes an analysis module layer having a plurality of analysis modules, wherein each analysis module of the plurality of analysis modules is assembled from one or more view of the set of views. The architecture moreover includes an application layer having a plurality of applications, wherein each application of the plurality of applications is assembled from one or more analysis module.

22 Claims, 4 Drawing Sheets

DATA ARCHITECTURE AND USER INTERFACE FOR PLASMA PROCESSING RELATED SOFTWARE APPLICATIONS

BACKGROUND OF THE INVENTION

Plasma-enhanced processing, such as plasma-enhanced etching and plasma-enhanced deposition, has long been employed to process substrates (e.g., silicon wafers, flat panels) into electronic products (such as integrated circuits or flat panel displays or liquid crystal displays). The processing of a substrate using plasma-enhanced techniques is highly complicated and tends to involve highly skilled personnel operating complex plasma equipments. The complexity of plasma-enhanced processing may be somewhat alleviated using software applications that can control, monitor, analyze, and/or respond to events that occur in the plasma processing chamber.

However, due to the complexity of modern, high-device-density plasma processing, techniques, a large amount of data and a highly complex array of software applications are typically involved in the plasma processing of a given batch of substrates. For example, different software applications may be employed to control the wafer movement, to start/stop the plasma, to generate a specific type of plasma from a specific recipe, to control the various knobs to effect processing in accordance with a given recipe, to monitor the health of the chamber, to analyze throughput, to generate alarms, etc.

As plasma processing requirements evolve toward the production of ever-shrinking devices, even the most skilled human operator can become overwhelmed with the vast arrays of ever-changing software applications involved in the operation and maintenance of a complex multi-chamber plasma processing cluster. This is partly because each of these software applications may provide a large set of features or capabilities that are accessible and/or capable of being productively utilized only after extensive training and exposure to the features/capabilities of that specific software application.

Further, even if one were to master one specific software application, the features and capabilities of a different software application that is also necessary for the plasma processing of substrates may involve the use of different user interface look/feel or navigation steps, a different way of presenting data, a different way for the human operator to acquire the data needed for a given operation, etc. Since the human operator must learn the unique user interface navigation or look/feel of each individual plasma-processing-related software (PPRS) application and must get familiarized with the different data acquisition steps of each PPRS application, extensive training is typically required before a human operator can become productive with the requisite suite of software applications necessary to efficiently operate a modern plasma processing machine.

On an ongoing basis, if the feature set or the capabilities of any given software application in the suite change due to, for example, a version update, the human operator may be required to re-learn the new user interface and/or data acquisition steps for that updated software application. For some human operators, the complexity becomes overwhelming and there is no motivation to learn a new PPRS application or to delve deeper into existing PPRS applications than absolutely necessary to perform the minimum required to produce substrates. As a result, the complexity of present PPRS applications prevents the human operator from realizing the full potential of the rich feature set provided with each of the PPRS applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
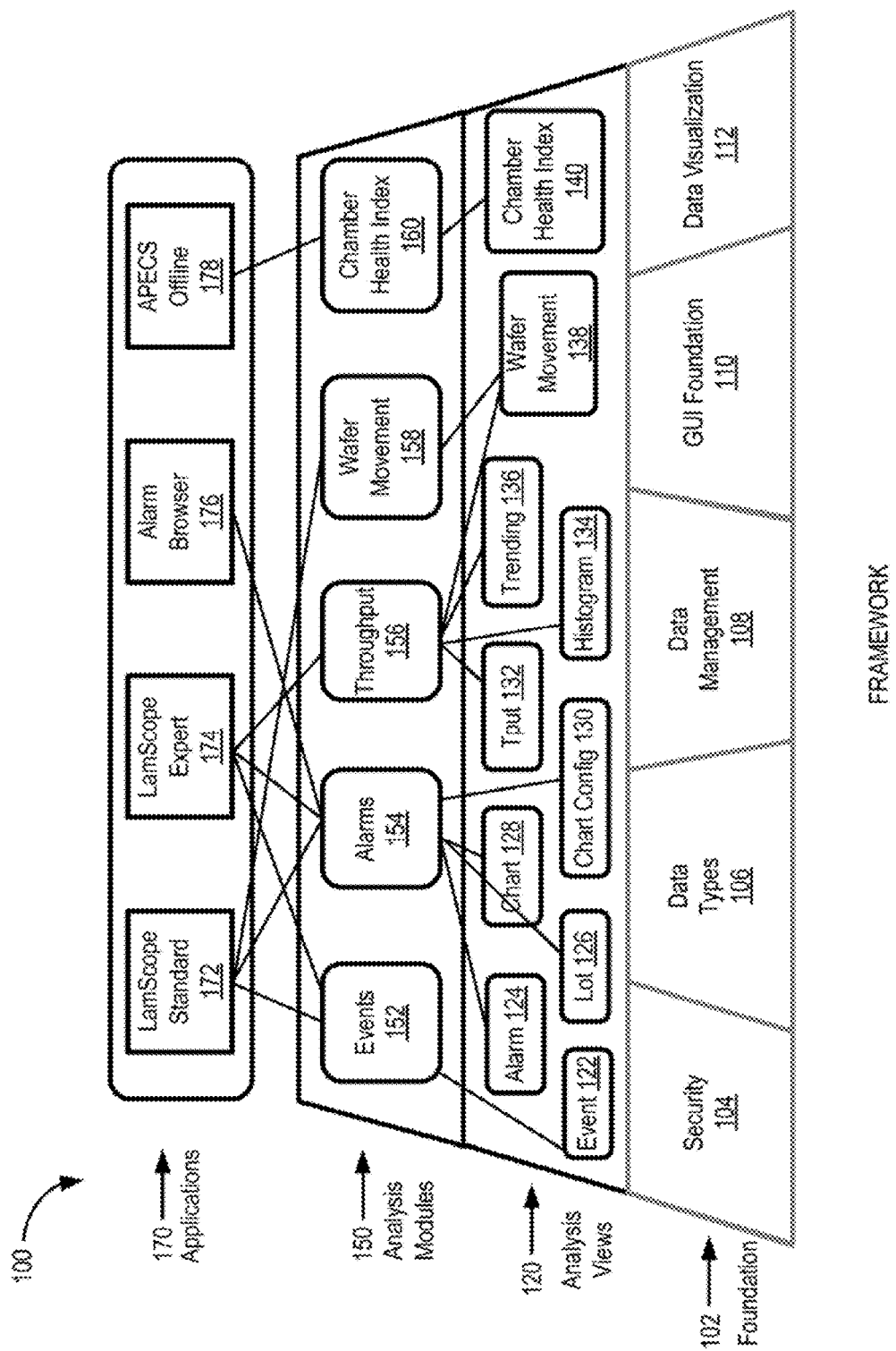
FIG. 1 shows, in accordance with an embodiment of the invention, a conceptual diagram of the four layers that comprise an example inventive PPRS architecture.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention promote a consistent user interface (navigation and/or look/feel) and consistent data management/access among the different PPRS applications of a PPRS application suite employed in the plasma processing of substrates. Further, embodiments of the invention promote reusability of building blocks such that new PPRS applications may be more rapidly developed. Further, any new PPRS application developed would follow substantially the same consistent user interface and consistent data management/access to encourage user adoption and to facilitate rapid training and application deployment.

In one or more embodiments, a PPRS architecture having four or more layers is provided. In a preferred embodiment and as described in the examples herein, a four-layer PPRS architecture is contemplated. In other embodiments, a greater number of layers may be employed if desired. In one or more embodiments, the four layers are, from the lowest level to the highest level, the foundation layer, the analysis view layer, the analysis module layer, and the application layer.

At the lowest level is the foundation layer that includes framework items commonly employed by the views in the analysis view layer. At the next higher level above the foundation layer is the analysis view layer, which comprises various views (pages) that leverage (e.g., access, defined by, or employ) the common set of framework items in the foundation layer. At the next higher level above the analysis view layer is the analysis module layer, which comprises the various modules that leverage (e.g., access, defined by, or employ) the common set of analysis views of the analysis view layer. Different combinations of analysis views may be employed to create one or more analysis modules. Finally, at the next higher level above the analysis module layer is the application layer, which comprises the various applications that leverage (e.g., access, defined by, or employ) the common set of analysis modules of the analysis module layer. Different combinations of analysis modules may be employed to create one or more applications.

To further elaborate, in the foundation layer, framework items that handle low-level security, low-level data management/access, and low-level UI navigation and look/feel or visualization are provided. These framework items govern how different views or pages may look, may be navigated, or may access/manage data, for example. The different views or pages may then be combined in various combinations, following the UI and data access/management rules defined by the framework items in the foundation layer, to create different analysis modules. Since the different analysis modules follow the same set of UI and data access/management rules and leverage the same common set of analysis views, reusability of analysis views is promoted in the development of new analysis modules. Farther, once the human operator learns bow to navigate a specific page/view or how to access/manage data through a particular page/view, substantially the same UI look/feel and navigation steps may be experienced when the same page/view is employed in a different module. In this manner, learning complexity is substantially minimized when new modules are encountered by the human operator.

Still further, the different modules may then be combined in various combinations, following the UI and data access/management rules defined by the framework items in the foundation layer, to create different applications. Since the different applications follow the same set of UI and data access/management rules and leverage the same common set of analysis modules, reusability of analysis modules is promoted in the development of new applications. Further, once the human operator learns how to navigate a specific module or how to access/manage data through a particular module, substantially the same UI look/feel and navigation steps may be experienced when the same module is employed in a different application. In this manner, learning complexity is substantially minimized when new applications are encountered by the human operator.

Further, the framework may provide items that are common for all applications. In other words, a framework container may be provided, which framework container UI and data access/management may be consistently maintained irrespective of which application is provided in the suite (assuming these framework container UI steps and data access/management needs are common across the various applications of the suite). In this manner, the human operator is presented with substantially the same UI look/feel and the same data management/access steps for the suite irrespective of which applications may be populated in the suite or how many applications may be populated in the suite or which application is currently in focus.

The features and advantages of various embodiments may be better understood with reference to the figures and discussions that follow.

FIG. 1 shows, in accordance with an embodiment of the invention, a conceptual diagram of the four layers that comprise an example inventive PPRS architecture 100 that promotes reusability, consistent UI and consistent data management access across all PPRS applications in the suite. With reference to FIG. 1, there is shown a foundation layer 102 comprising a plurality of framework items 104-112. Framework items 104-112 (Security 104, Data Types 106, Data Management 108, GUI Foundation 110, Data Visualization 112) of example FIG. 1 include framework items in three broad categories: security, data access/management, and UI.

For example, there is shown a security framework item 104 which may include security definitions and may govern authentication access and privilege by users. Data access/management comprises two framework items: data types 106 and data management 108. Data types 106 may contain data definitions from the tools 50 the various views/modules may access the data in a consistent manner. Data management 108 may define where data is stored, how data is formatted in various data stores, and how the various data stores may be accessed.

UI framework items may comprise GUI (Graphical User interface) foundation framework item 110 and data visualization framework item 112. GUI foundation framework item 110 may include UI definitions and rules that support a consistent UI look/feel and/or navigation by the views/modules/applications/framework that leverage on the definitions and rules associated with GUI foundation framework item 110. Data visualization framework item 112 may include data visualization tools such as chart tools, table tools, etc.

Above foundation layer 102 is analysis view layer 120. Analysis view layer 120 comprises views (which may be presented as pages on the display screen) that are created using the definitions/rules/methods specified by the framework items in foundation layer 102. Accordingly, views 122-140 (Event 122, Alarm 124, Lot 126, Chart 128, Chart Config 130, Tput 132, Histogram 134, Trending 136, Wafer Movement 138, Chamber Health Index 140) of analysis view layer 120 have a consistent UI look/feel and navigation since they leverage from the same definitions/rules/methods specified by GUI foundation framework item 110 and data visualization framework item 112. Further, views 122-140 of analysis view layer 120 have the same data management/access/loading steps and methodology since they leverage from the same data definitions/rules/methods specified by data type framework item 106 and data management framework item 108. If security is implemented for one or more of views 122-140 of analysis view layer 120, security is implemented consistently since views 122-140 leverage from the same security definitions/rules/methods specified in security framework item 104.

In the example of FIG. 1, alarm view 124 is employed to obtain alarm specification parameters and to display alarms when conditions necessitating an alarm alert occur. Lot view 126 allows a human operator to review wafer lot information. Chart view 128 displays data in a graphical manner depending on which chart is specified. Wafer movement view 138 displays data pertaining to the transportation of wafer in/out of the various processing modules of the plasma processing tools. These are only examples and other ones of views 122-140 of analysis view 120 will be elaborated later herein when discussing examples to aid in the appreciation of the advantages of the inventive PPRS architecture.

Above analysis view layer 120 is analysis module layer 150. Each of analysis modules 152-160 (Events 152, Alarms 154, Throughput 156, Wafer Movement 158, Chamber Health Index 160) is assembled from one or more of views 122-140 of analysis view layer 120. A view from analysis view layer 120 may be employed exclusively by a single analysis module of analysis module layer 150 or may be employed by different analysis modules of analysis module layer 150. As an example, chamber health index view 140 is employed only by chamber health index module 160. As another example, wafer movement view 138 is employed by both wafer movement module 158 and throughput module 156.

Above analysis module layer 150 is application layer 170. Each of applications 172-178 (LamScope Standard 172, LamScope Expert 174, Alarm Browser 176, APECS Offline 178) is assembled from one or more of modules 152-160 of analysis module layer 150. A module from analysis module layer 150 may be employed exclusively by a single application of application layer 170 or may be employed by different applications of application layer 170. As an example, LamScope Standard application 172 may employ a combination of modules that includes events module 152, alarms module 154, and wafer movement module 158. As another example, LamScope Expert application 174 may employ a different combination of modules, namely events module 152, alarms module 154, and throughput module 156. As yet another example, APECS Offline application 178 may employ only chamber health index module 160. As still another example, alarm browser module 176 may employ only alarm module 154

Since the applications (in application layer 170) are built from modular analysis modules (in analysis module layer 150), which are in turn built from modular analysis views (in analysis view layer 120), which in turn leverage (e.g., access, defined by, or employ) the same set of framework items in foundation layer 102, there is a common UI look/feel and navigation in the same view irrespective of which module(s) the view is employed in. Further, the above-mentioned structure results in the same common UI look/feel and navigation in the same module irrespective of which application(s) the module is employed in.

In addition, since data management/access/loading in all views/modules/applications are leveraged off the same set of framework items in foundation layer 102, data is accessed and managed in the same way from application to application, from module to module, and from view to view irrespective of which module a specific view happens to be employed in and irrespective of which application a specific module happens to be employed in.

Reusability is also highly promoted since the views leverage from the same pool of framework items; the modules leverage from the same pool of views; and the applications leverage from the same pool of modules.

Additionally, the data access/management and UI definitions/rules/methods also govern global tools that are common to all applications. Examples of these global tools include the "Load Data", "Save Data", and "Delete Data" facilities that are common across all applications. Accordingly, as a human operator switches among applications of the suite, not only are the views/modules/applications have substantially the same UI look/feel and navigation as well as substantially the same data access/management but the same set of global tools are also consistent irrespective of which application happens to be employed by the human operator at any given point in time.

Another aspect of reusability is the ease with which new applications may be developed. Suppose a new data type is generated by one of the tools and becomes available for use. If a view is provided to access and analyze this new data type, the developer of a new application does not need to understand how to access and analyze this new data type. The developer in this case simply employs an appropriate module that employs that view, and data access and management details are hidden from that developer. The same view may of course be employed by a different analysis module for a different purpose, and may be employed by the same new application or yet another different application if desired.

In contrast, prior art custom applications would require the developer to custom craft user-interface look/feel and navigation from scratch, as well as require the developer to understand how to access and manage data at the most fundamental data management/access level. Even if certain UI parts and data access/management routines were already developed for another existing application, reusability of those parts may not be possible since different applications may be developed in the past using different application development environments (which renders, for example, a Java chart unusable in a C++ development environment). In one or more embodiments of the invention, views/modules/applications of the inventive PPRS architecture are developed in the C# programming language and .NET Framework development environments, available from a variety of vendors including Microsoft Corporation of Redmond, Wash. It should be pointed out that other programming languages and development environments may also be employed as long as they are employed consistently across all views/modules/applications of the PPRS suite.

Furthermore, since the views/modules/applications all leverage from the same framework items in the foundation layer, localization and upgrade may be efficiently accomplished. For example if a particular PPRS application needs to be localized for a particular country, the framework items employed by that PPRS application may be modified to conform to localization requirements and all views/modules/applications are automatically localized as a consequence.

Figure 2:
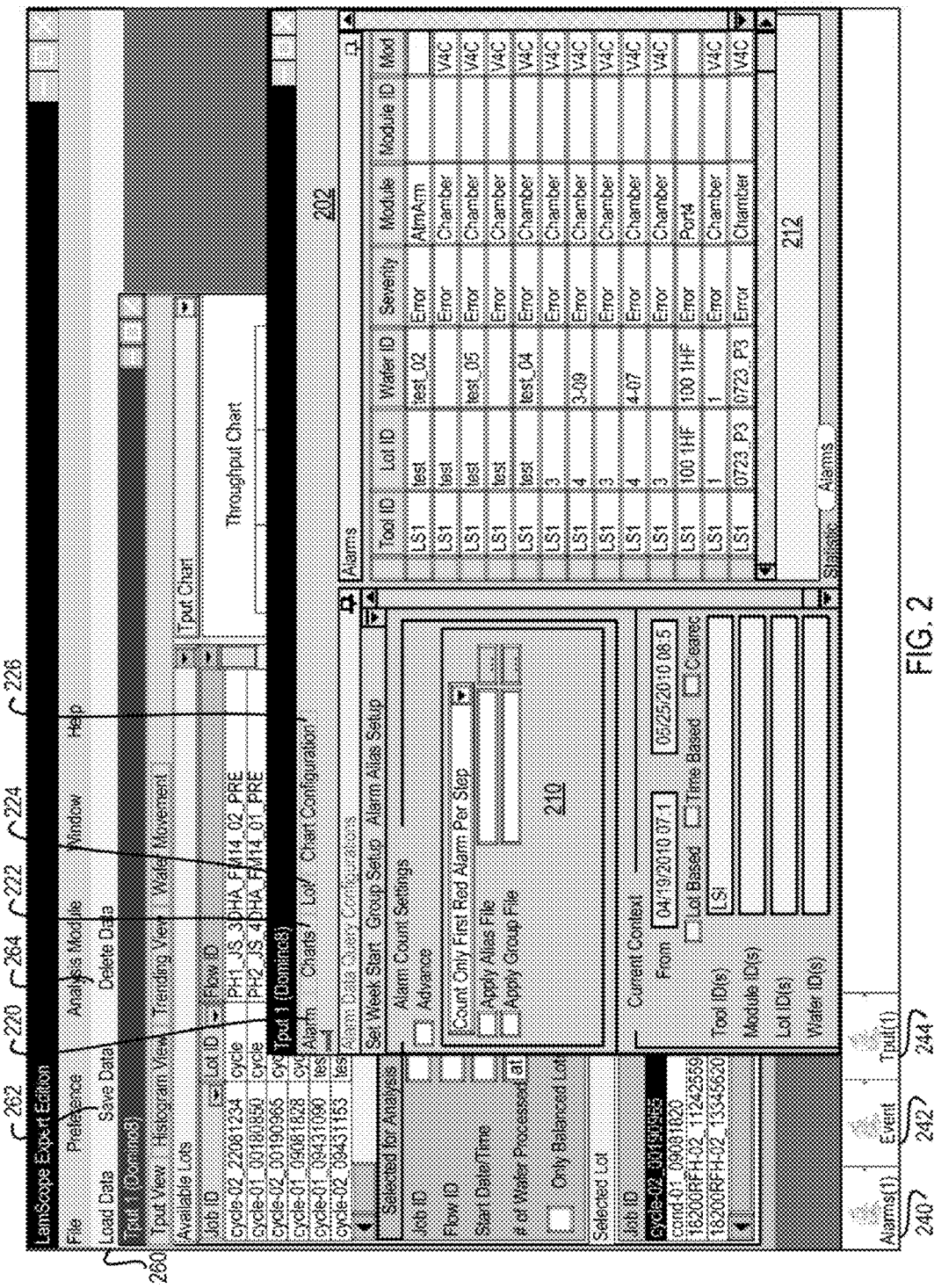
FIG. 2 is an example screenshot of an application in which various instances of modules and views are shown.

FIG. 2 is an example screenshot of an application (LamScope Expert in this case—see FIG. 1, reference number 174) in which an instance of the throughput module (reference number 156 of FIG. 1) and an instance of the alarms module (reference number 154 of FIG. 1) are launched. More specifically, the alarm view (reference number 124 of FIG. 1) of the alarms module (reference number 154 of FIG. 1) is currently in focus in FIG. 2.

In the page that implements the alarm view in the foreground of FIG. 2, two widgets 210 and 212 are shown. Widget 210 is employed to specify the alarm data query configuration and widget 212 is employed to display the alarms. The UI look/feel, of these two widgets 210 and 212 are governed by the UI framework items 110 and 112 in FIG. 1.

The various views of alarms module 202 (see reference number 154 of FIG. 1 for comparison) are implemented by tabs 220, 222, 224, and 226. Thus tab 220 (Alarm) corresponds to alarm view 124 in the architecture drawing of FIG. 1. Tab 222 (Chart) corresponds to the chart view 128 in the architecture drawing of FIG. 1. Tab 224 (Lot) corresponds to the lot view 126 in the architecture drawing of FIG. 1. Tab 226 (Chart Configuration) corresponds to the chart configuration view 130 in the architecture drawing of FIG. 1. By selecting one of tabs 220-226, the human operator can chose which view of alarm module 202 is in toe us at a given time. Furthermore, if alarm module 202 is implemented in a different application, the same tabs and widgets discussed would appear substantially the same, and the UI navigation steps would be implemented substantially the same. Similarly, the data management/access by the views of alarm module 202 would be implemented in substantially the same manner. Accordingly, experience and knowledge acquired by a human operator with a given module in one application readily renders that human operator proficient when interacting with the same module in a different application.

The various modules of the LamScope Expert application of FIG. 2 may be accessed via icons 240, 242, and 244 of FIG. 2. These three icons correspond to the three modules 152, 154, and 154 of FIG. 1 that make up the LamScope Expert application 174 of FIG. 1. The alarm module is in focus since the human operator selected icon 240. To bring another module into focus, the human operator simply selects its corresponding icon. The look/feel of these icons are also governed by the UI framework items discussed in connection with FIG. 1 and is consistent across applications such that the human operator can access modules of any given application by selecting an appropriate icon in the lower left corner (the location of the icon set being arbitrary—as long as the location is consistent across applications, the location choice is not as important).

Global tool icons 260, 262, and 264 ("Load Data", "Save Data", "Delete Data") are also shown in FIG. 2. Generally speaking, these global tool icons implement global tools that are part of the broader framework and are common across applications and have a consistent look/feel/navigation across applications. The look/feel of these global tool icons are also governed by the UI framework items discussed in connection with FIG. 1 and is consistent across applications such that the human operator can readily access these global tools while working with any given application by selecting an appropriate icon in the upper left corner (the location of the global tools icon set being arbitrary—as long as the location is consistent across applications, the location choice is not as important).

Figure 3:
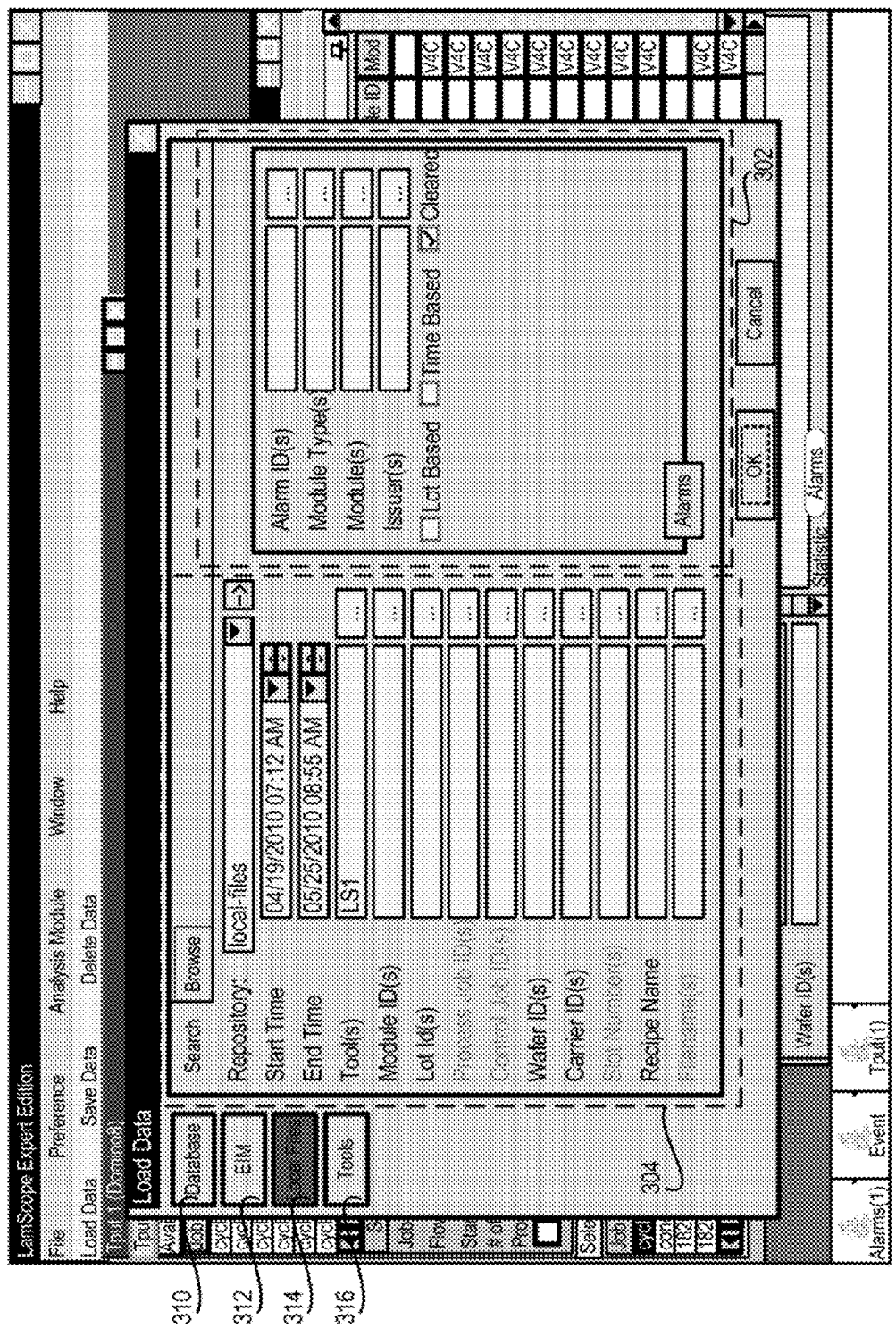
FIG. 3 shows an example of the Load Data panel with certain general context and specific context data fields.

FIG. 3 shows an example of the "Load Data" global tool being activated (e.g., by activating the "Load Data" icon 260 of FIG. 2). In this particular example, the load data panel is being called up while the human operator is working with the Alarm analysis module within the LamScope Expert application. The UI look/feel/navigation of the load data panel, like the UI look/feel/navigation of other components of the PPRS architecture, is governed by the UI framework items 110 and 112 of FIG. 1 to enforce a consistent UI experience. Data management/access by the load data panel of FIG. 3 leverages from the data management/access framework items 106 and 108 of FIG. 1 to standardize data access/management.

Contextual information provided to the load data tool allows the load data panel to be properly populated for the particular module/application that the human operator is current working with. It should be noted that the load data panel of FIG. 3 may be reused with different applications. However, different contextual information associated with different applications may result in different fields being populated in certain subsections of the load data panel (albeit with substantially similar UI look/feel/navigation and substantially similar data management/access methodology).

Generally speaking, there exist at least two types of context information that govern the fields populated in a particular page. General context specifies the fields that exist irrespective of which specific view/module/application currently in focus. Examples of general context data fields include tool identity, data generation time, etc. In contrast, specific context specifies the fields that may be populated depending on which view/module/application is in focus when the page is called up. For example, the fact that the alarm analysis module is in focus would result in specific context fields pertaining to alarm analysis such as alarmID (e.g., which tool or sensor issues the alarm).

Thus, the contextual information (general or specific) govern which fields are displayed and the controls to manipulate the attributes associated with these fields. In one or more embodiments of the invention, the fields associated with the general context information is displayed in a widget in a generally defined area of the page while the fields associated with the specific context information is displayed in another widget in another generally defined area of the page.

To further elaborate, in the example of FIG. 3, the fact that the Alarms analysis module of the LamScope Expert application is currently in focus causes specific context widget 302 to display fields that are dependent upon this specific context. In contrast, widget 304 displays fields that are invariant irrespective of which view/module/application is currently in focus. The fact that the Alarms analysis module of the LamScope Expert application is currently in focus causes the load data panel of FIG. 3 to display four possible data source choices 310, 312, 314, and 316 for selection. In an embodiment, auto-discovery performed upon power-up or periodically may be employed to ascertain the number and identity of the data sources that contain the alarm data, for example.

Figure 4:
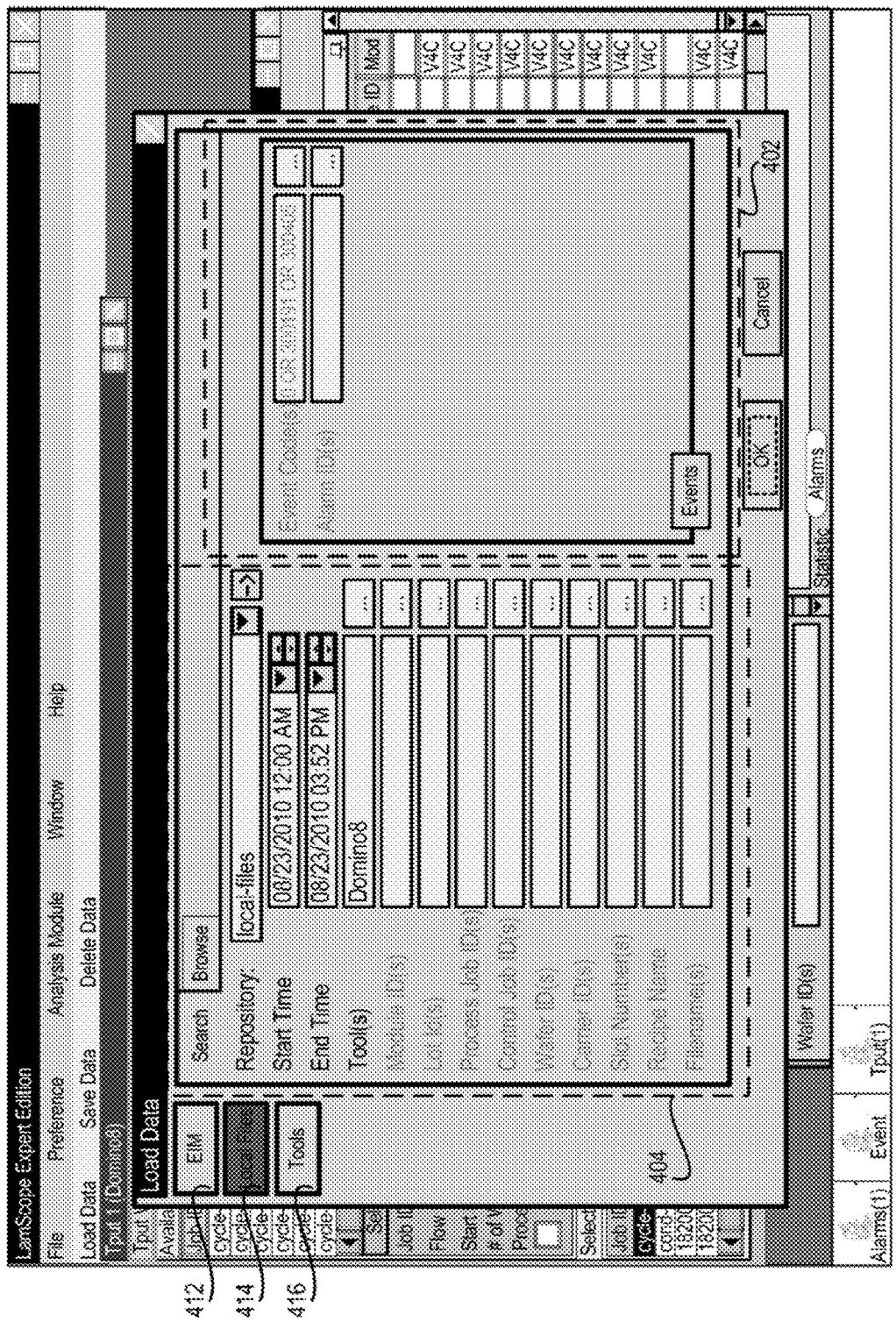
FIG. 4 shows another example of the Load Data panel with different specific context data fields from the specific context data fields of FIG. 3 due to differences in the specific contextual data.

Contrast the load data panel of FIG. 3 with the load data panel of FIG. 4. In the example of FIG. 4, the load data panel displays in general context widget 404 the same fields seen in general context widget 304 of FIG. 3. This is because the fields associated with widgets 304 of FIGS. 3 and 404 of FIG. 4 are general context fields and do not depend on the specific view/module/application currently in focus. However, specific context widget 402 displays different fields from the fields displayed in specific context widget 302 of FIG. 3 because the load data panel of FIG. 4 is called up while a different module (the Throughput module in the case of FIG. 4) is in focus. Note that the specific contextual information also causes the load data panel of FIG. 4 to specify only 3 sources (412, 414, and 416) as possible data source choices for obtaining throughput data.

Further, it should be noted that although the load data panels of FIG. 3 and FIG. 4 may contain different fields due to the different contexts from which the data panel is activated, much of the UI look/feel stays the same since the UI is enforced by the same rules from the same UI framework items in the foundation layer. Thus the shape of the icons for selecting the data sources generally looks the same, and these icons are disposed in the same general location in the page in different load data panels even though the number of data source icons may vary. As another example, the general context data fields in general context widget 304 of FIG. 3 and general context widget 404 look substantially the same since these data fields are invariant with respect to the specific view/module/application currently in focus. Further, the controls for manipulating, attributes associated with these fields look the same in FIGS. 3 and 4. As yet another example, although the specific context data fields are different in FIGS. 3 and 4 (reference numbers 302 and 402), the general location (e.g., consistently the right side of the page although the choice of the right side is arbitrary) of these fields is substantially the same in both figures to enforce, as much as possible, a consistent UI look/feel.

As can be appreciated from the foregoing, embodiments of the invention result in consistent UI look/feel/navigation, which greatly increases the efficiency with which a human operator may adopt and become productive in a given application of the PPRS suite when that human operator has already been exposed to similar views and/or similar modules in other applications of the PPRS suite. The consistency of UI look/feel/navigation across modules and applications substantially shortens the teaming curve when a new PPRS application is encountered by a human operator.

By enforcing UI look/feel/navigation at the lowest level (i.e., the foundation layer), all views/modules/applications advantageously follow the definitions/rules/methods specified by the framework items in the foundation layer. Thus, UI-related changes may be easily accomplished and may propagate consistently across different views/modules/applications by simply changing the definitions/rules/methods in the UI framework items at the foundation layer.

Furthermore, because the views, modules, and applications are built in a modular manner from combinations of entities in the layers below, data access/management abstraction is accomplished, data access/management itself is consistent across the views/modules/applications and reusability of building blocks is high. Consequently, new applications can be efficiently developed from existing modules/views/framework items, greatly reducing the cost of implementing software tools to operate and maintain the variety of plasma equipment systems required to accommodate today's ever-evolving and increasingly more stringent process requirements.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It is therefore intended that the following appended claims be interpreted as including all such alterations, permutations, and equivalents as fall within the true spirit and scope of the present invention.

What is claimed is:

1. An architecture for creating a plasma-processing-related application, said architecture stored on a non-transitory storage medium that is operatively connected to at least one processor, whereby the at least one processor executes functions programmed into the following layers, components, set of views, modules and applications, said architecture comprising:
    a foundation layer having a plurality of framework components, wherein said framework components including at least one of security component, data management component and user interface (UI) component;
    an analysis view layer having a set of views, wherein said set of views are generated utilizing components from said foundation layer;
    an analysis module layer having a plurality of analysis modules, wherein each analysis module of said plurality of analysis modules is assembled from one or more view of said set of views; and
    an application layer having a plurality of applications, wherein each application of said plurality of applications is assembled from one or more analysis module.

2. The architecture of claim 1 wherein said framework component includes said security component including at least security definitions.

3. The architecture of claim 1 wherein said framework component includes said data management component including at least one of
    data types, wherein said data types including at least data definitions from a set of tools, and
    data management, wherein said data management including at least location of stored data, format of said stored data, and a mean for accessing said stored data.

4. The architecture of claim 1 wherein said framework component includes said UI component including at least one of
    graphical user interface (GUI) component, wherein said GUI including at least one of UI definitions and rules, and
    data visualization component, wherein said data visualization component including at least one of charts and tables.

5. The architecture of claim 1 wherein said set of views are presented as a set of pages on a display screen, wherein each view of said set of views having at least one of
    a consistent UI with consistent navigational mode,
    a consistent data management methodology, and
    a consistent security methodology.

6. The architecture of claim 1 wherein a view of said set of views is utilized by a single analysis module.

7. The architecture of claim 1 wherein a view of said set of views is utilized by multiple analysis modules.

8. The architecture of claim 1 wherein an analysis module of said plurality of analysis modules is utilized by a single application.

9. The architecture of claim 1 wherein an analysis module of said plurality of analysis modules is utilized by multiple applications.

10. The architecture of claim 1 wherein each view of said set of views is modular.

11. The architecture of claim 1 wherein each analysis module of said plurality of analysis modules is modular.

12. A computer-implemented method for providing a common data architecture and user interface (UI) in creating plasma-processing-related applications, comprising:
    setting up a plurality of framework components based on a foundation layer, wherein said plurality of framework components including at least one of security component, data management component and user interface (UI) component;
    generating a set of views, wherein said set of views are developed utilizing components from said foundation layer;
    combining one or more views to create at least one analysis module; and
    combining one or more analysis modules to create at least one application.

13. The computer-implemented method of claim 12 wherein said plurality of framework components including said security component is provided by establishing security definitions.

14. The computer-implemented method of claim 12 wherein said plurality of framework components including said data management component is provide by at least one of
    establishing data types, wherein said data types including at least data definitions from a set of tools, and establishing data management, wherein said data management including at least location of stored data, format of said stored data, and a mean for accessing said stored data.

15. The computer-implemented method of claim 12 wherein said plurality of framework components including said UI component is provide by at least one of
   establishing a graphical user interface (GUI) component, wherein said GUI including at least one of UI definitions and rules, and
   establishing a data visualization component, wherein said data visualization component including at least one of charts and tables.

16. The computer-implemented method of claim 12 wherein said set of views are presented as a set of pages on a display screen, wherein each view of said set of views having at least one of
   a consistent UI with consistent navigational mode,
   a consistent data management methodology, and
   a consistent security methodology.

17. The computer-implemented method of claim 12 wherein a view of said set of views is utilized by a single analysis module.

18. The computer-implemented method of claim 12 wherein a view of said set of views is utilized by multiple analysis modules.

19. The computer-implemented method of claim 12 wherein an analysis module of said plurality of analysis modules is utilized by a single application.

20. The computer-implemented method of claim 12 wherein an analysis module of said plurality of analysis modules is utilized by multiple applications.

21. The computer-implemented method of claim 12 wherein each view of said set of views is modular.

22. The computer-implemented method of claim 12 wherein each analysis module of said plurality of analysis modules is modular.

* * * * *